Patented Dec. 11, 1928.

1,694,924

UNITED STATES PATENT OFFICE.

RUSSELL EDMUND LOWE, OF NEW YORK, N. Y., ASSIGNOR TO DOHERTY RESEARCH COMPANY, OF NEW YORK, N. Y., A CORPORATION OF DELAWARE.

BONDED REFRACTORY.

No Drawing.   Application filed April 28, 1925.   Serial No. 26,532.

The present invention relates to bonded refractories, and more particularly to bonded zircon refractories.

It has long been known that the presence of the bond in bonded refractories has caused the bonded refractory to sinter at a temperature much below that at which the unbonded material can be fused. The sintering point of a refractory used in hearths is not so important but in walls, bricks, and the like manufactured articles the sintering point of a bonded refractory is the practical limit of temperature at which an article can be used for most purposes. The lowering of the sintering point of bonded refractories by the material of the bond has imposed severe limitations in practice on the use of such materials. It has been proposed to use a minimum amount of bond, but it has not been known how to incorporate an artificially made bond in a refractory and also to keep the amount of bonding substance low enough to avoid material lowering of the sintering point without sacrificing necessary mechanical strength in the manufactured article.

According to the present invention, the sintering point of articles manufactured of bonded refractory materials is maintained close to the melting points of the refractory materials themselves and at the same time the mechanical strength of the manufactured articles is maintained so high under high or low temperature conditions that the refractory articles are adapted to a wide range of uses. The results just mentioned are obtained by precipitating a small amount of adherent metal hydrate material, such as a hydroxide of a metal, in adhering contact with the refractory particles to be bonded, and shaping and firing the article, the additional substance formed at the time the hydrate substance is precipitated being eliminated from the refractory either before firing or during the act of firing. The amount of bonding substance must be kept below one percent by weight of the finished article for practically all refractories in order to keep the sintering point close to the fusing point and preferably below six-tenths of one percent.

The present invention has been used successfully in connection with manufactured refractory articles of zirconia, zirconium silicate, commonly known as zircon, and magnesite, but is not limited to articles made from these substances.

In order to enable those wishing to utilize the present invention to do so without difficulty, a specific example of a satisfactory method of carrying out the present invention is given as follows:

An aggregate of zircon or other refractory material is made with particles graded in size and ranging from those of extreme fineness to the largest available of uniform size so that the aggregate may have a very small percentage of voids. A soluble substance capable of yielding a bonding material suitable for use with the refractory aggregate to be bonded, preferably to an amount such that the final bonding material, estimated as oxide, is not more by weight than six-tenths of one percent of the weight of the aggregate, is dissolved in water and the resulting solution intimately mixed with the said graded aggregate to form a paste. To the mass so produced is added a solution of a precipitating agent in sufficient quantity to completely precipitate a hydroxide material in intimate adhering contact with the refractory particles. If the material to be precipitated is gelatinous iron hydroxides or iron hydrate, ferric chloride crystals are dissolved in water and the solution used to wet the aggregate. The wetted aggregate is then treated with ammonium or other soluble hydroxide. It has been found that in order to ensure satisfactory strength, the refractory particles should be wet with the solution containing iron or other substance intended to enter into the bond before treatment with the precipitating agent. For example, if the zircon or other refractory is wet first with the solution of iron salt, or the like, the precipitated iron hydroxide, or other water insoluble hydroxide, adheres much more strongly to the refractory when formed than if the zircon is wet first with the precipitating agent, such as ammonium hydroxide solution or the like. An experiment illustrating the difference in adhesiveness of bonds containing material such as iron hydroxide formed under the different conditions may be readily performed by wetting two pieces of zircon, one with iron chloride and the other with ammonium hydroxide solution. The first is then treated with ammonium or other suitable hydroxide and the second with iron chloride. In each case, iron hydroxide is precipitated on the zircon pieces, but in the case of the piece wetted first with the ammonium hydroxide, or the like, the precipitated hydroxide of iron may be readily washed off the zircon, whereas in the case of the piece wetted first with iron chloride, the precipitated hydroxide of iron adheres strongly to the zircon and is washed off, if at all, only with difficulty.

If the final article is desired to be non-porous as well as highly refractory, the salt formed when the hydrate is precipitated, for instance, is washed out of the mass of refractory and adhering precipitated iron hydrate. As just shown, this washing can be performed without danger of dislodging the hydroxide material with relation to the particles on which it was precipitated. If on the other hand, an article having some porosity is desired, ammonium hydroxide is used as the precipitating agent, resulting in forming ammonium chloride, sal ammoniac, at the time the iron hydrate is precipitated, the sal ammoniac acting to cause porosity during a later step of the process as hereinafter described.

After the mass of refractory particles and hydroxide material has been formed as previously described, and has either been freed of the substance formed when the bonding material was precipitated or contains such a substance as desired, the mass is shaped, preferably under pressure, preliminary to firing.

In carrying out the process of making a refractory according to the present invention, it has been found that the presence of ammonium chloride in the mixture forming the shaped refractory articles is important also in that the unfired articles after drying possess material strength. They can therefore be handled prior to firing and without danger of breaking them. This feature due to ammonium chloride of relatively high strength in the dried but unfired articles, is, of course, largely independent of the character of the bonding material or the process of its production. During the step of firing the articles shaped as previously mentioned, the sal ammoniac, if present, is first volatilized and driven off. After the sal ammoniac or similar compound is volatilized or decomposed and driven off by the heat, the adherent hydrated oxide or hydroxide, such as hydrated iron oxide, gives up water, changing to anhydrous compound of iron or the like which adheres strongly to the refractory particles bonding them firmly together. A further advantageous characteristic of the ammonium chloride with relation to the present invention is that it is volatilized and driven out of the shaped article before the water of combination. The bond is therefore not disturbed by the removal of volatile substance from the shaped article, as the hydrated oxide can readily permit the passage through it of the ammonium chloride vapors while the oxide is in the plastic state before the loss of its water of combination without disturbing its contact with the refractory particles of the aggregate.

Owing to the driving off of the sal ammoniac, or like volatile product, at the time of firing the shaped articles during the firing period, the fired article has a large number of minute channel-like voids and the refractory thus produced has its heat insulating properties greatly enhanced. For instance, a bonded zircon refractory produced according to the present process and having the voids just mentioned possesses about four times the specific resistance to heat flow of fire clay. If however, a higher degree of resistance to heat flow is required in the refractory, sawdust, straw or a like oxidizable or volatilizable substance or substances may be incorporated into the refractory material to go into the articles according to the present invention prior to shaping the articles therefrom and firing the same. Preferably such combustible material is incorporated into the mixture of precipitated bonding material and refractory aggregate immediately prior to the shaping and firing steps, but the invention is not limited to this. Volatilizable substances such as ammonium chloride, sal ammoniac, may also be used either in place of or together with the combustible substances mentioned to create a porous or cellular structure in the articles during firing. Due to the burning out or volatilizing of the sawdust, or like substance, during the firing of the articles, a large number of pores and cells are formed in the articles, giving them a porous cellular structure highly resistant to the flow of heat. If, however, the salt, such as sal ammoniac, formed when the bonding material is precipitated has been washed out of the mixture of bond and refractory prior to firing, the resulting articles are dense and possess a high capacity to transmit heat by radiation at high temperatures.

By keeping down the amount of iron or like salt used as above described, the oxide or other material entering into the bond is distributed throughout the aggregate with great uniformity and is produced in film form which, in accordance with known laws governing films, is inherently strong and possesses a maximum adhesion for the particles of zircon or other refractory material, constituting the refractory aggregate. In consequence the refractory body as a whole not only has a maximum strength but does not sinter,—nearly the full temperature of the melting point of the refractory material being required to cause the refractories to change shape in the absence of external pressure.

It has been found, moreover, that according to the present invention, a bond for zircon having remarkably valuable properties may be formed from precipitated hydrate.

It has long been known that zirconium silicate, commonly known as zircon, is highly refractory. This material, however, has certain characteristics which have caused the bonded articles, such as bricks, etc., made therefrom to fail under the conditions encountered in the majority of uses. The output of bonded zircon refractories has consequently been severely restricted. In some instances, the difficulties encountered in the use of bonded zircon refractories have come from softness or from mechanical weakness and in other cases, from spalling due to loosening of the bond by unequal expansion and contraction of the zircon and bond when heated and cooled.

According to the present invention, a bonded zircon refractory of high mechanical strength and considerable hardness is obtained by bonding zircon with material formed from precipitated metal hydrate or hydroxide. It is well known that artificially bonded zircon articles have not gone into the extensive use that the physical characteristics of zircon have seemed to promise. Tests of zircon refractories according to the present invention indicate a mechanical strength and refractoriness under widely varying temperatures, together with a degree of freedom from spalling that indicates a wide field of usefulness.

When the bonded refractory according to the present invention is used under certain circumstances, as for example for coating a boiler setting, it may be fired by the subsequent operation of the equipment. In any case, the firing does not need to be carried to an excessive temperature in order to develop the desired mechanical and thermal characteristics of the finished article.

Instead of the bonds formed from precipitated iron oxide, refractory articles according to the present invention may include bonds formed from any metal oxide which precipitates from aqueous solution as a normal hydrate or hydroxide, or mixtures of such oxides. Further illustrations of oxides useful according to the present invention are precipitated chromium, zirconium, aluminum, nickel, cobalt or manganese oxides.

It will be evident that the best results obtained according to the present invention are due to the simultaneous presence of several factors; namely, the low percentage of bonding material and absence of salt formed when the oxide is precipitated, giving a high sintering point, together with the very even distribution of the bond due to the oxide being precipitated in adherent contact with the aggregate, whereby the other salt formed may be removed and the mixture shaped and fired without disturbing the distribution of the oxide. However, I do not limit myself to the simultaneous use of all the factors just enumerated.

It will be understood, further, that wherever the wetting of refractory particles by a solution is referred to in the following claims, it is intended to include not only the preparation of the solution from a salt, but the formation of the solution of the salt within the mass of refractory particles to be used by first mixing a metal oxide or hydrate with the refractory particles and then treating the mixture with an acid.

Having thus described my invention, I claim:—

1. An article of manufacture comprising a graded refractory aggregate bonded by less than one percent of a highly adherent bond formed by the chemical precipitation of a hydrate in intimate adhering contact with the particles of the aggregate, and substantially free from other substances formed at the time of precipitating said material.

2. An article of manufacture comprising a graded refractory aggregate bonded by less than six-tenths of one percent of highly adherent bond formed by the chemical precipitation of a hydrate in intimate adhering contact with the particles of the aggregate, and substantially free from other substances formed at the time of precipitating said hydrate.

3. The steps of a method of preparing refractory articles for firing comprising wetting a refractory aggregate with a solution of a substance containing hydrate forming material for entering into the desired bonding material, said solution containing an amount of said substance capable of forming less than one percent by weight of bonding material of the finished article, and treating the wetted aggregate with a chemical hydrate precipitating agent.

4. The steps of a method of preparing refractory articles for firing comprising wetting a refractory aggregate with a solution of a salt containing a hydrate forming substance for entering into the desired bonding material, said solution being capable of yielding less than one percent by weight of bonding material of the finished article when completely precipitated, and precipitating said solution with a reagent forming therewith a hydrated oxide.

5. An article of manufacture comprising refractory particles bonded by less than one percent by weight of bond formed by the chemical precipitation of a metal hydrate in intimate adhering contact therewith.

6. An article of manufacture comprising refractory particles bonded by less than six-tenths of one percent by weight of bond formed by the chemical precipitation of a hydrate in intimate adhering contact therewith.

7. A method of making refractory articles comprising chemically precipitating in adherent contact with refractory particles to be bonded an amount of an insoluble compound convertible on firing into an oxide bond of less than one percent by weight of the finished article.

8. A method of making refractory articles of zircon comprising precipitating in adherent contact with the particles of a zircon aggregate an amount of a hydrate capable of forming a bond of less than one percent by weight of the finished article.

9. A method of making refractory articles comprising forming a mixture containing refractory particles and a solution of a salt of a substance intended to form part of the article, and precipitating bonding material among said particles by reacting on said salt with a solution of a substance forming as a result of the reaction both a hydrated oxide and a substance volatilizable at a lower temperature than the water of constitution of the substance which is to be formed into the bond.

10. The steps of a method of preparing a bonded refractory article for firing comprising wetting particles of a refractory aggregate with a solution of metal chloride, and precipitating hydroxide in adherent contact with said particles by ammonia.

11. An article of manufacture comprising zircon and a bond formed from metal oxide.

12. An article of manufacture comprising a refractory of graded zircon particles and a bond formed from metal hydrate.

13. An article of manufacture comprising zircon and a bond formed from a hydrate and in which the metal estimated as oxide comprises not more than one percent by weight of the article.

14. An article of manufacture comprising an aggregate of graded zircon particles and a bond formed from a hydrate, and in which the metal estimated as oxide comprises not more than one percent by weight of the article.

15. An article of manufacture comprising zircon and a bond formed from a hydrate and containing a great number of minute voids and channels.

16. The method of making a zircon refractory comprising precipitating a hydrate in contact with zircon particles, shaping said particles, and firing the resulting article.

17. The method of forming a zircon refractory comprising mixing zircon particles with a metal salt, precipitating hydroxide in contact with said particles by a chemical reaction forming at the same time a volatilizable substance, shaping the mixture of zircon and hydroxide and firing the article so produced.

18. The method of making zircon refractories comprising mixing zircon particles with a metal salt containing not more than six-tenths of one percent by weight of metal as compared to the weight of the particles taken, precipitating hydroxide in contact with said particles and at the same time forming a volatilizable substance, shaping under pressure the mixture of particles and hydroxide so formed and firing the articles so produced.

19. The method of making a bonded refractory article comprising precipitating a material capable of forming a bonding agent in contact with the refractory particles to be bonded, the reagents used in precipitating said material forming at the same time ammonium chloride, shaping and drying the article, and then firing it.

20. The method of forming a bonded zircon refractory article comprising wetting zircon particles with a solution of metal chloride precipitating hydroxide in contact with said particles by treating the wetted zircon with ammonia, thereby forming ammonium chloride at the same time that the hydroxide is precipitated, shaping and drying the article, and then firing it.

21. In a method of bonding refractory particles, the steps of wetting the particles first with a solution of a metal salt, and then precipitating hydroxide in contact with the particles to be bonded by treating the wetted particles with a hydroxide.

22. The steps of a method of preparing for firing refractory articles having high resistance to transfer of heat therethrough comprising wetting a refractory aggregate with a solution containing a substance intended to form part of the bonding material, said solution being capable when fully precipitated of yielding less than one percent by weight of bonding material of the finished article, and precipitating bonding material in said aggregate by treatment of the wetted aggregate with a precipitating agent.

23. The steps of a method of preparing for firing bonded refractory articles having high resistance to transfer of heat therethrough comprising mixing a refractory aggregate with a solution of a metal forming an insoluble hydroxide, said solution containing an amount of metal salt capable of producing less than one percent by weight of the finished article of metal containing bond, and precipitating hydrate from said solution by ammonia.

24. A method of making refractory articles comprising precipitating in adherent contact with refractory particles to be bonded, a body of material containing metal oxide to an amount less than one percent by weight of the finished article.

25. The steps of a method of preparing refractory articles for firing comprising forming a mixture containing refractory particles and a solution of a metal salt, and precipitating bond forming material among said particles by reacting on said salt with a solution of a hydroxide, said solution of metal salt containing an amount of metal capable of forming less than one percent by weight of metal oxide of the finished article.

26. An article of manufacture comprising refractory particles and a bond formed by a hydrate chemically precipitated in intimate adhering contact with said particles and in which said bond comprises not more than one percent by weight of the article.

27. An article of manufacture comprising an aggregate of graded refractory particles and a bond formed by a hydroxide chemically precipitated in intimate adhering contact with said particles and in which said bond comprises not more than one percent by weight of the article.

28. An article of manufacture comprising refractory particles and a bond formed by hydroxide chemically precipitated in intimate adhering contact with said particles and containing a great number of minute voids and channels.

29. The method of making a zircon refractory comprising precipitating iron oxide in contact with zircon, particles, shaping said particles, and firing the resulting article.

30. The method of forming a zircon refractory comprising mixing zircon, particles with a metal salt, precipitating hydroxide in contact with said particles by a chemical reaction forming at the same time a volatilizable substance, shaping the mixture of zircon and hydroxide, and firing the article so produced.

31. The method of making refractories comprising mixing refractory particles with a metal salt containing not more than six-tenths of one percent by weight of metal as compared to the weight of the particles taken, precipitating hydroxide in contact with said particles and at the same time forming a volatilizable substance, shaping under pressure the mixture of particles and hydroxide so formed and firing the articles so produced.

32. The method of forming a bonded refractory article comprising wetting refractory particles with a solution of metal chloride, precipitating hydroxide in contact with said particles by treating the wetted particles with ammonia, thereby forming ammonium chloride at the same time that the hydroxide is precipitated, shaping and drying the article, and then firing it.

In testimony whereof I affix my signature.

RUSSELL EDMUND LOWE.